United States Patent [19]
Nakamura

[11] Patent Number: 5,272,617
[45] Date of Patent: Dec. 21, 1993

[54] APPARATUS FOR DETECTING SHORT-CIRCUIT FOR USE IN BI-POLAR D.C. TRANSMISSION SYSTEM

[75] Inventor: Naomi Nakamura, Tokorozawa, Japan

[73] Assignee: Kabushiki Kaisha Toshiba, Kawasaki, Japan

[21] Appl. No.: 888,593

[22] Filed: May 27, 1992

[30] Foreign Application Priority Data

May 31, 1991 [JP] Japan .................. 3-128098

[51] Int. Cl.$^5$ .................................. H02J 3/36
[52] U.S. Cl. ........................... 363/51; 363/35; 363/37
[58] Field of Search ........... 363/53, 51, 35, 79, 363/37, 85, 96; 361/93, 111

[56] References Cited

U.S. PATENT DOCUMENTS

| | | | |
|---|---|---|---|
| 3,558,981 | 1/1971 | Zochall | 361/42 |
| 3,968,419 | 7/1976 | Ekstrom | 361/118 |
| 4,186,391 | 1/1980 | Wang et al. | 340/645 |
| 4,212,054 | 7/1980 | Seki | 363/53 |
| 4,310,866 | 1/1982 | Wirth | 361/88 |
| 4,517,634 | 5/1985 | Sakai | 363/35 |
| 4,559,486 | 12/1985 | Spencer | 322/90 |
| 4,578,743 | 3/1986 | Inokuchi et al. | 363/35 |
| 4,672,519 | 6/1987 | Liss | 363/35 |
| 4,680,692 | 7/1987 | Sakai | 363/35 |
| 4,724,502 | 2/1988 | Kawahira et al. | 361/62 |
| 4,772,978 | 9/1988 | Oura et al. | 361/36 |
| 5,117,323 | 5/1992 | Asplund | 361/47 |

FOREIGN PATENT DOCUMENTS

| | | |
|---|---|---|
| 0219790 | 4/1987 | European Pat. Off. |
| 3445360 | 6/1985 | Fed. Rep. of Germany |
| 53-20304 | 6/1978 | Japan |
| 53-20305 | 6/1978 | Japan |
| 158942 | 9/1963 | U.S.S.R. ................ 363/53 |

Primary Examiner—Steven L. Stephan
Assistant Examiner—Ben M. Davidson
Attorney, Agent, or Firm—Foley & Lardner

[57] ABSTRACT

There is disclosed an apparatus for detecting a short-circuit of a bi-polar d.c. transmission system in which one end of a neutral line is ground and the other end thereof is not ground. This short-circuit detecting apparatus is adapted to detect a short-circuit between d.c. transmission lines on conditions that a current flowing in the neutral line is below a predetermined value, that a ground current at the ground point of the neutral line is below a predetermined value, and that a difference between bi-polar current command values is above a predetermined value.

6 Claims, 5 Drawing Sheets

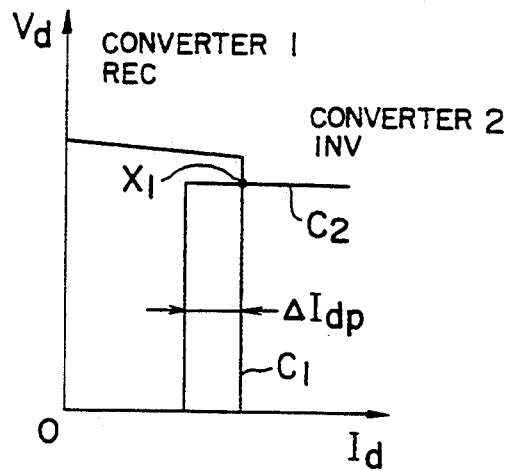
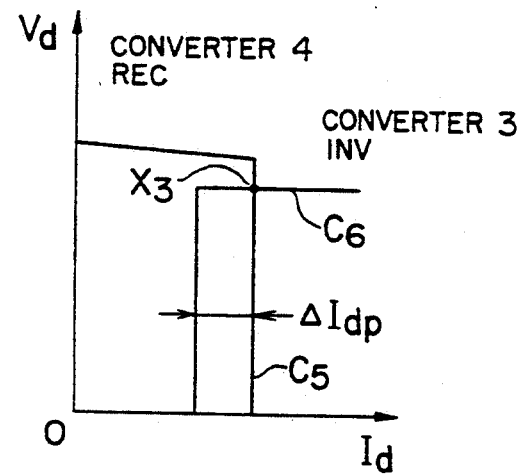
FIG. 3A
FIG. 3B
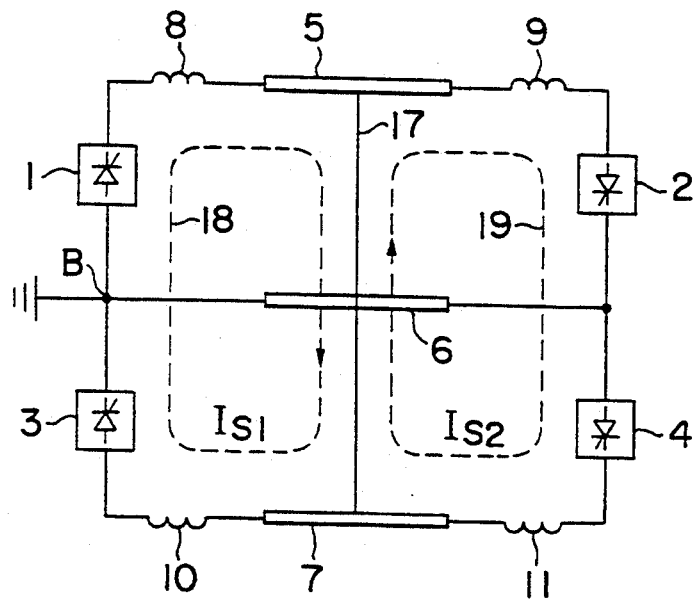
FIG. 4

APPARATUS FOR DETECTING SHORT-CIRCUIT FOR USE IN BI-POLAR D.C. TRANSMISSION SYSTEM

TECHNICAL FIELD OF THE INVENTION

This invention relates to an apparatus for detecting short-circuit in a bi-polar d.c. transmission system.

BACKGROUND OF THE INVENTION

As one means for linking two a.c. systems, a d.c. transmission system is used because of the merits of cost and other characteristics. Such a d.c. transmission system, a bi-polar transmission system with a neutral line (conductor), as shown in FIG. 1, is known. Roughly speaking, the system of FIG. 1 is such that two a.c. systems 20 and 25 are linked through d.c. transmission lines 5 and 7 and a neutral line 6. Two sets of power converters 1 and 3 are provided on the a.c. system 20 side, and two sets of power converters 2 and 4 are provided on the a.c. system 25 side. The a.c. terminals of the power converters 1 and 3 are connected to the first a.c. system 20 respectively through transformers 21 and 23, and the a.c. terminals of the power converters 2 and 4 are connected to the second a.c. system 25 respectively through transformers 22 and 24. The d.c. transmission line 5 constitutes a transmission line of a first pole, the d.c. transmission line 7 constitutes a transmission line of a second pole, and the neutral line 6 constitutes a line common to the both poles. Between the power converters 1 and 2, the first pole the power converter 1, a d.c. reactor 8, the d.c. transmission line 5, a d.c. reactor 9, the power converter 2, and the neutral line 6, is formed. Further, between the power converters 3 and 4, the second pole comprised of including the (converter 3, the neutral line 6, the power converter 4, a d.c. reactor 11, the d.c. transmission line 7, and a d.c. reactor 10 is formed. Respective power converters 1 to 4 can be operated both as a rectifier and as an inverter. Ordinarily, one end B of the neutral line 6 is grounded on the a.c. system 20 side serving as a sending end. The other end A of the neutral line 6 is not grounded. Power converters 1, 2, 3 and 4 are operated and controlled as a rectifier or an inverter by converter control units 12, 13, 14 and 15, respectively. A current command value $I_{dp1}$ is delivered from a current command output circuit 16 to the converter control units 12 and 13, and a current command value $I_{dp2}$ is delivered from the current command output circuit 16 to the converter control units 14 and 15. Such a control circuit is described in U.S. Pat. No. 4,578,743 as background of the invention.

Explanation will be given in connection with a typical operating mode in the d.c. transmission system of the bi-polar configuration shown in FIG. 1, such that the power converters 1 and 3 are caused to be operated as a rectifier and the power converters 2 and 4 are caused to be operated as an inverter in order to send power from the first a.c. system 20 to the second a.c. system 25. In this case, since a voltage on the d.c. transmission line 5 of the first pole is positive, the first pole is called a positive pole, depending upon circumstances. Further, since a voltage on the d.c. transmission line 7 of the second pole is negative, the second pole is called a negative pole, also depending upon circumstances. In Japan, in order to avoid the problem of an electrical contact, etc. of the underground installed equipment (service water pipe, etc.) by a ground current in the case of communication trouble or an earth return path system, the system of grounding one end of the neutral line 6 as described above is the main current. In other countries, however, there are many instances where the receiving end A is also grounded to constitute an earth return path to thereby omit the neutral line.

Assuming now that the power converters 1 and 3 carry out a rectifier operation, and the power converters 2 and 4 carry out an inverter operation, voltage/current characteristics of respective poles are set as shown in FIGS. 2A and 2B. In FIGS. 2A and 2B, the X-axis and the Y-axis represent a d.c. current $I_d$ and a d.c. voltage $V_d$, respectively. When it is assumed that the power converters 1 and 3 are respectively operated with constant current characteristics $C_1$ and $C_3$ and the power converters 2 and 4 are respectively operated with constant voltage characteristics $C_2$ and $C_4$, the operating points of the both poles are intersecting points $X_1$ and $X_2$ of the both characteristic lines, respectively. As a result, a d.c. current $I_{d1}$ flows in the first pole, and a d.c. current $I_{d2}$ flows in the second pole. At this time, a current $\Delta I_d = Id_1 - I_{d2}$ indicative of a difference therebetween flows in the neutral line 6. It is to be noted that, while constant current control values smaller by a current margin $\Delta I_{dp}$ than constant current control values of the power converters 1 and 3 in the rectifier operation mode are set at the respective power converters 2 and 4 in the inverter operation mode, the constant current control of the power converters 1 and 3 effectively functions in an ordinary state, but the constant current control function of the power converters 2 and 4 is ineffective. In this instance, consideration is taken such that it is not until the d.c. current value lowers by the current margin $\Delta I_{dp}$ that the constant current control of the power converters 2 and 4 becomes effective.

Here, at the first pole, for example, in the case where a current varies in a direction of increasing a current command value, the voltage/current characteristic of the power converter 1 of the first pole changes or shifts to the characteristic indicated by broken lines $C_{11}$ of FIG. 2A. Followed by this, the constant current characteristic of the power converter 2 shifts in a direction of increasing the current command value by the same value as above. A new operating point of the first pole is the intersecting point $X_{11}$ of the constant current characteristic line $C_{11}$ and the characteristic line $C_2$.

Let us now suppose the case where, at the first pole, the power converter 1 carries out a rectifier operation and the power converter 2 carries out an inverter operation in the same manner as stated above, whereas, at the second pole, the power converter 4 on the a.c. system 25 side carries out a rectifier operation and the power converter 3 on the a.c. system 20 side carries out an inverter operation unlike the above. In this case, at the first pole, a tidal current from the a.c. system 20 side toward the second a.c. system 25 side takes places, and at the second pole, a tidal current from the second a.c. system 25 side toward the first a.c. system 20 side takes place. Namely, the system will be operated by tidal currents in directions different from each other with respect to two poles. Such an operating state is generally called a power sending back operation. In the power sending back operation, tidal current in different directions take place with respect to the both poles. A difference between transmission powers of the both poles serves as an actual transmission power between a.c. systems 20 and 25. This power sending back operation is used for carrying out, between both a.c. systems, power of a value smaller than minimum operating powers of individual power converters for a frequency correction of the a.c. system, or for other reasons.

The voltage/current characteristics of respective poles at this time are as shown in FIGS. 3A and 3B, respectively. In FIGS. 3A and 3B, power converters 1 and 4 are operated in conformity with the constant current characteristics $C_1$ and $C_5$, and the power converters 2 and 3 are operated in conformity with the constant voltage characteristics $C_2$ and $C_6$. Accordingly, the operating points of the both poles are intersecting points $X_1$ and $X_3$ of the both characteristic curves, respectively.

Let now consider the behavior in the case where a short-circuit trouble takes place between d.c. transmission lines 5 and 7 under the state where a power sending back operation is carried out in the circuit of FIG. 1.

In FIG. 4, a flow of currents in the case where a short-circuit takes place between the d.c. transmission lines 5 and 7 under the state where the power converters 1 and 4 carry out a rectifier operation and the power converters 2 and 3 carry out an inverter operation is indicated by broken lines. By occurrence of this short-circuit, between the power converters 1 and 3, there is formed a first current loop 18 in which a d.c. current $I_{s1}$ flows through the power converter 1 (in the rectifier operation mode), the d.c. reactor 8, (a portion of) the d.c. transmission line 5, a short-circuited portion 17, (a portion of) the d.c. transmission line 7, the d.c. reactor 10, and the power converter 3 (in the inverter operation mode); and, between the power converters 4 and 2, there is formed a second current loop 19 in which a d.c. current $I_{s2}$ flows through the power converter 4 (in the rectifier operation mode), the d.c. reactor 11, (a portion of) the d.c. transmission line 7, the short-circuited portion 17, (a portion of) the d.c. transmission line 5, the d.c. reactor 9, and the power converter 2 (in the inverter operation mode).

By formation of these current loops, the operating points of the power converters 1 to 4 are caused to be newly in conformity with the voltage/current characteristics shown in FIGS. 5A and 5B unlike the case of FIGS. 3A and 3B. Namely, in the first current loop 18, since the power converter 1 is operated by the constant current characteristic $C_1$, and the power converter 3 is operated by the constant voltage characteristic $C_6$, the operating point $X_4$ is determined by the both characteristics $C_1$ and $C_6$. On the other hand, in the second current loop 19, since the power converter 4 is operated in accordance with the constant current characteristic $C_5$, and the power converter 2 is operated in accordance with the constant voltage characteristic $C_2$, the operating point $X_5$ is determined by the both characteristics $C_2$ and $C_5$.

In the case where transmission powers are equal to each other, i.e., d.c. currents are equal to each other with respect to the both poles before such short-circuit failure takes place, even if a short-circuit as described above takes place on the d.c. transmission lines, there is no change in voltage/current of respective operating points of FIGS. 3 and 5, so any change does not substantially take place in currents flowing in respective d.c. transmission lines. For this reason, a current differential relay and/or a current directional relay for detecting changes in a current flowing direction, etc., generally provided at d.c. transmission lines cannot detect a short-circuit failure as described above.

Here, in the case where only a current command value of the first pole is increased, constant current control values of the voltage/current characteristics of the power converters 1 and 2 shift in directions indicated by broken lines $C_{12}$ and $C_{21}$ of FIGS. 5A and 5B, respectively. In this case, a new operating point of the first current loop 18 in FIG. 4 changes to $X_6$ (FIG. 5A). On the contrary, in the second current loop 19, the current command value shifts in an increasing direction as indicated by broken lines $C_{21}$ in FIG. 5B by the power converter 2. However, the operating point $X_5$ determined by the both characteristics $C_2$ and $C_5$ is not changed, so the operating point still remains at the point $X_5$. In the state of the voltage/current characteristic of FIG. 5B, since it becomes impossible to ensure a current margin $\Delta I_{dp}$ of a predetermined value between power converters 4 and 2, which is determined by the characteristic curves $C_5$ and $C_{21}$, it is easy for constant current control by the power converter 2 in the inverter operation mode to be carried out. As a result, any interference in control may take place between the both power converters 4 and 2. Here, when it is assumed that the current command value of the first pole is increased, the constant current control value indicated by broken lines in FIG. 5B further shifts in a direction indicated by an arrow in FIG. 5B, so the operating point cannot be ensured. Eventually, there is the possibility that the system may be down with respect to the both poles, and/or any power converter may be damaged, so its bad influence will be exerted on the a.c. system.

Accordingly, it is required to take any measure to promptly and securely detect a short-circuit failure between d.c. transmission lines in the case where a power sending back operation is carried out in a bi polar d.c. transmission system thus to prevent in advance inconveniences such as system down, etc.

SUMMARY OF THE INVENTION

An object of this invention is to provide an apparatus for detecting a short-circuit of a bi-polar d.c. transmission system, which is capable of securely detecting a short-circuit between transmission lines, occurring in carrying out a power sending back operation in a bi-polar d.c. power transmission system.

To achieve the above-mentioned object, in accordance with this invention, there is provided an apparatus for detecting a short-circuit of a bi-polar d.c. transmission system in which one end of a neutral line is grounded and the other end thereof is not grounded. The short-circuit detecting apparatus includes first monitoring means for providing a detection output when a current flowing through the neutral line is below a predetermined value. A second monitoring means provides a detection output when a ground current a ground point of the neutral line is below a predetermined value. A third monitoring means monitors current command values of both poles to provide a detection output when the difference between both current command values is above a predetermined value. A logic circuit is responsive to outputs from the first, second and third monitoring means.

BRIEF DESCRIPTION OF THE DRAWINGS

In the accompanying drawings:

FIGS. 3A and 3B are characteristic diagrams showing an operating point of power converters in the case where a power sending back operation is carried out;

FIG. 4 is a diagram for explaining the flowing state of a d.c. current in the case where a short-circuit takes place in a d.c. transmission system at the time of a power sending back operation;

DETAILED DESCRIPTION OF THE PREFERRED EMBODIMENTS

Figure 6:
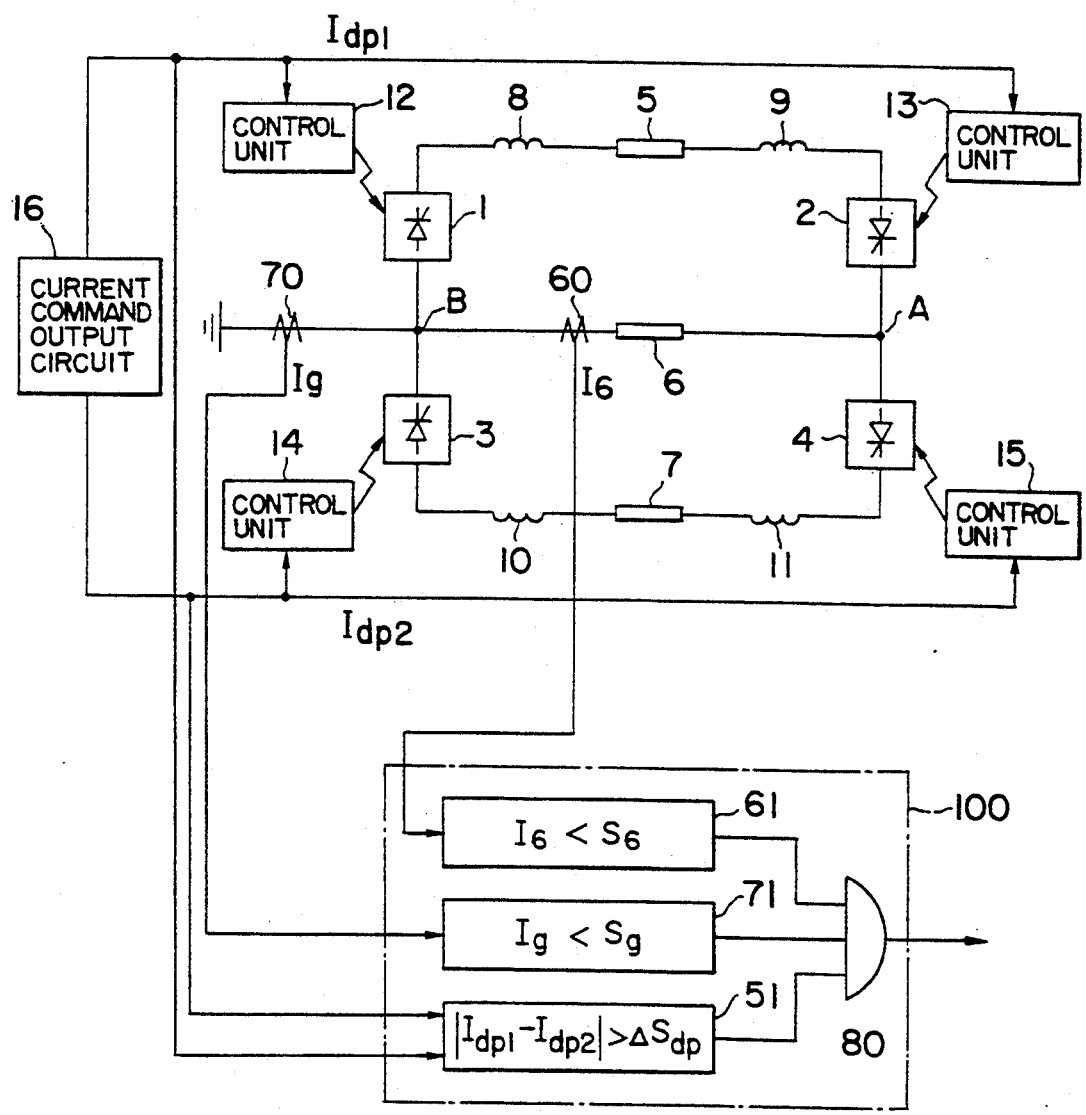
FIG. 6 is a block diagram showing an embodiment of an apparatus for detecting a short-circuit according to this invention.

FIG. 6 is a block diagram showing an embodiment of this invention. Respective elements or components of a power system in this figure are represented by using the same reference numerals as those of FIG. 1. In FIG. 6, power converters 1, 2, 3 and 4 are operated and controlled as a rectifier or an inverter by converter control units 12, 13, 14 and 15, respectively. A current command value $I_{dp1}$ corresponding to a transmission power of the first pole is delivered from a current command output circuit 16 to the converter control units 12 and 13, and a current command value $I_{dp2}$ corresponding to a transmission power of the second pole is delivered from the current command output circuit 16 to the converter control units 14 and 15. A current $I_6$ flowing in the neutral line 6 is detected by a current detector 60, and a ground current $I_g$ at the ground point B of the neutral line 6 is detected by a current detector 70. Detected outputs $I_6$ and $I_7$ by the current detectors 60 and 70 and current command values $I_{dp1}$ and $I_{dp2}$ from the current command output circuit 16 are introduced to a short-circuit detecting unit 100.

In the short-detecting unit 100, monitor circuits 51, 61 and 71 and an AND gate 80 are provided. The monitor circuit 51 monitors current command values $I_{dp1}$ and $I_{dp2}$ of the both poles to output a logic signal "1" when a difference between both command values is above a first predetermined value $\Delta S_{dp}$, i.e., $|I_{dp1} - I_{dp2}| > \Delta S_{dp}$. The first predetermined value $\Delta S_{dp}$ is a little smaller than a current margin $\Delta I_{dp}$ in the d.c. power transmission system, for example, equal to a 70-80% of the current margin $\Delta I_{dp}$. The monitor circuit 61 monitors neutral line current $I_6$ to output a logic signal "1" when that current is below a second predetermined value $S_6$ (i.e., $I_6 < S_6$). In addition, the monitor circuit 71 monitors ground current $I_g$ to output a logic signal "1" when that current is below a third predetermined value $I_g$ (i.e., $I_g < S_g$). The second and third predetermined values $S_6$ and $S_g$ are nearly equal to zero, respectively. Output signals from these monitor circuits 51, 61 and 71 are introduced to the AND gate 80.

Figure 1:
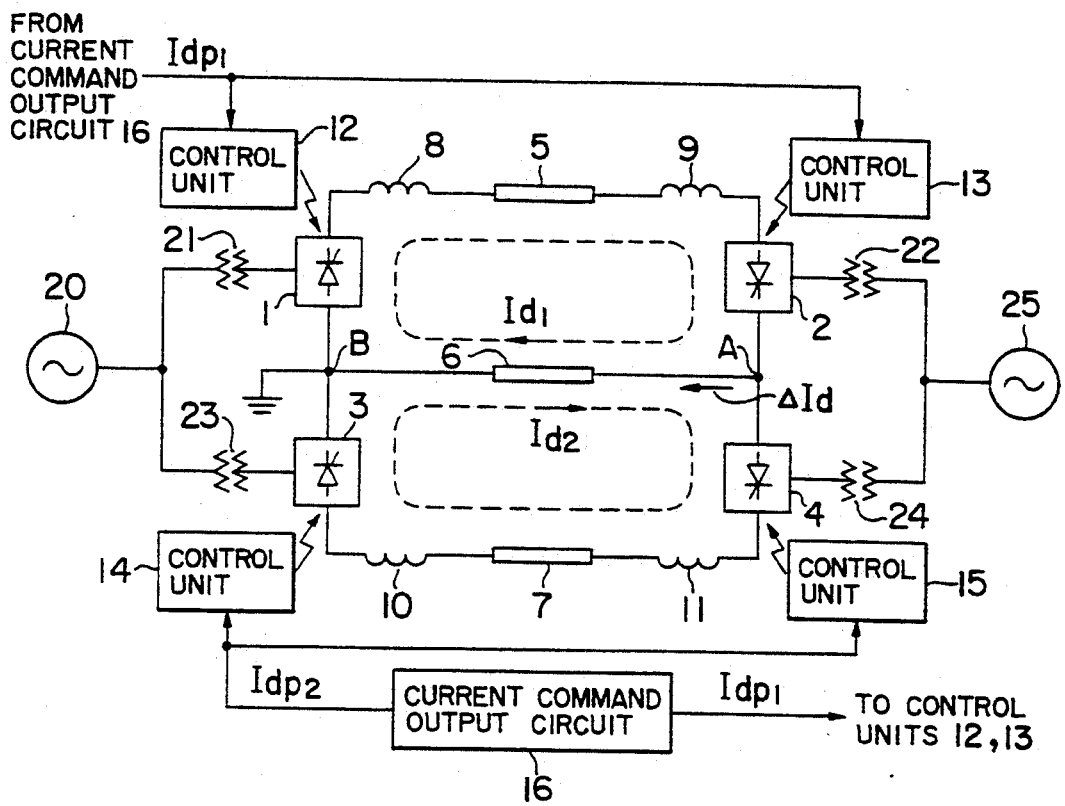
FIG. 1 shows a typical d.c. transmission system of the bi-polar structure.
Figures 2A, 2B:
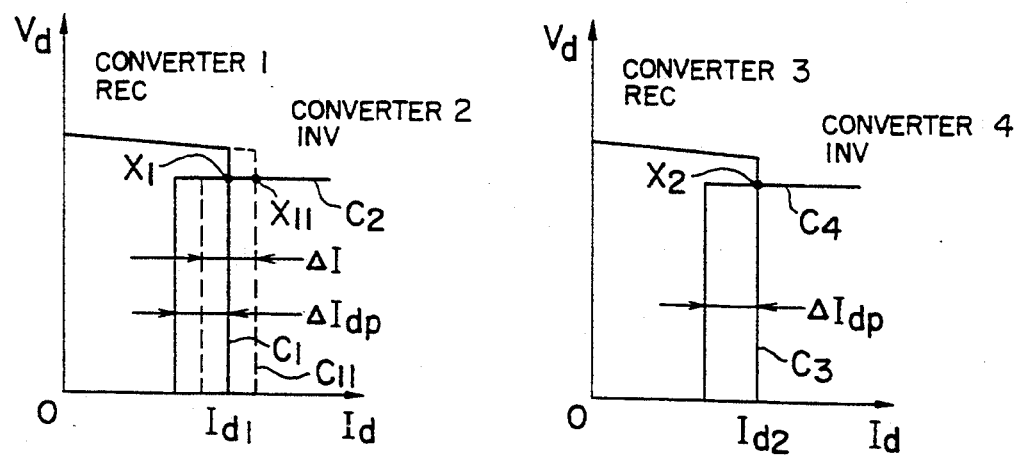
FIGS. 2A and 2B are characteristic diagrams showing an operating point in an ordinary operating state of power converters used in the d.c. transmission system.
Figure 5A:
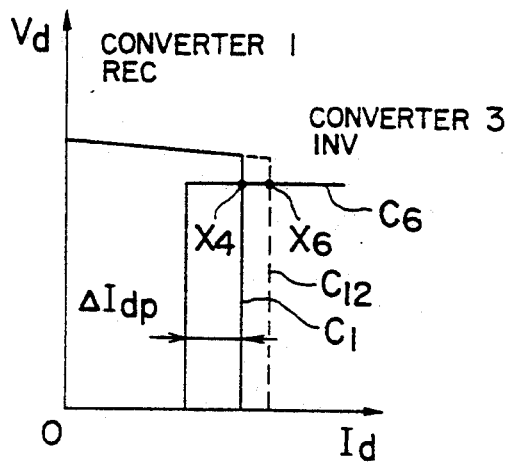
FIGS. 5A and 5B are characteristic diagrams showing operating points of respective power converters in the case where a short-circuit takes place in a d.c. transmission system at the time of a power sending back operation.
Figure 5B:
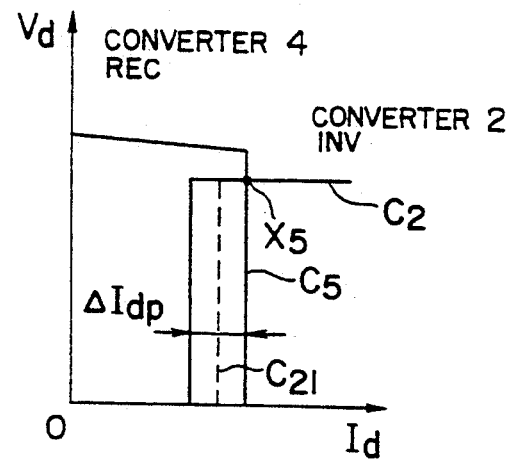

In the state where current command values $I_{dp1}$ and $I_{dp2}$ of the both poles are not equal to each other, a difference therebetween is above predetermined value (i.e., $|I_{dp1} - I_{dp2}| > \Delta S_{dp}$), and a power sending back operation is carried out, Currents $I_{d1}$ and $I_{d2}$ flow through routes or paths as shown in FIG. 1. For this reason, a difference current $\Delta I_d = I_{d1} - I_{d2}$ flows in the neutral line 6. Assuming now that a short-circuit takes place between d.c. transmission lines 5 and 7, currents $I_{s1}$ and $I_{s2}$ flow through routes or paths as shown in FIG. 4. For this reason, no current flows in the neutral line 6, resulting in the state where relationship expressed as $I_6 < S_6$ holds.

Figure 7:
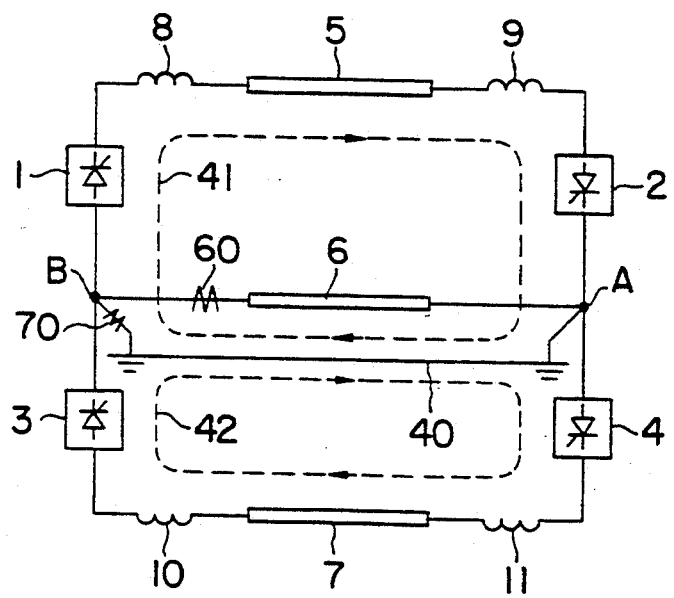
FIG. 7 is a diagram showing the flowing state of a current when a ground fault occurs at the time of a power sending back operation.

On the other hand, when a ground fault is assumed to take place at the point A at the time of a power sending back operation, as shown in FIG. 7, there are formed a first current loop 41 including the power converter 1, the d.c. reactor 8, the d.c. transmission line 5, the d.c. reactor 9, the power converter 2, the grounding point A, a ground return path 40, the current detector 70, and the ground point B, and a second current loop 42 including the power converter 4, the d.c. reactor 11, the d.c. transmission line 7, the d.c. reactor 10, the power converter 3, the ground point B, the current detector 70, the ground return path 40, and the grounding point A. In the case where a ground fault takes place at the point A as in the above case, while there only results the state where no current flows in the neutral line 6, there is no possibility that the operating points of respective power converters may change. In this case, a difference between currents of the both current loops 41 and 42 flows in the current detector 70, and the relationship expressed as $I_g > S_g$ holds at this time. For this reason, there is no possibility that the monitor circuit 71 provides a logic "1" output. This ground fault is not a fault to be detected by the detecting apparatus of this invention. Accordingly, in this invention, the monitor circuit 71 is provided in order to detect a short-circuit failure of the d.c. transmission system in a manner to discriminate it from the ground fault.

When a difference between bi-polar current command values are not equal to each other, and a difference between both command values has the relationship expressed as $|I_{dp1} - I_{dp2}| > \Delta S_{dp}$, the monitor circuit 51 outputs a logic signal "1". In addition, when a short-circuit fault takes place between d.c. transmission lines 5 and 7 in the state where a power sending back operation is carried out, the neutral line current $I_6$ ceases to flow, so there results the state where the relationship expressed as $I_6 < S_6$ (see FIG. 4) holds. Thus, the logical output of the monitor circuit 61 shifts to "1". Since logical outputs of the monitor circuits 51, 61 and 71 are all "1" as stated above, the logical output of the AND circuit 80 becomes "1". Thus, it is possible to detect a short-circuit failure of the d.c. transmission system.

Figure 8:
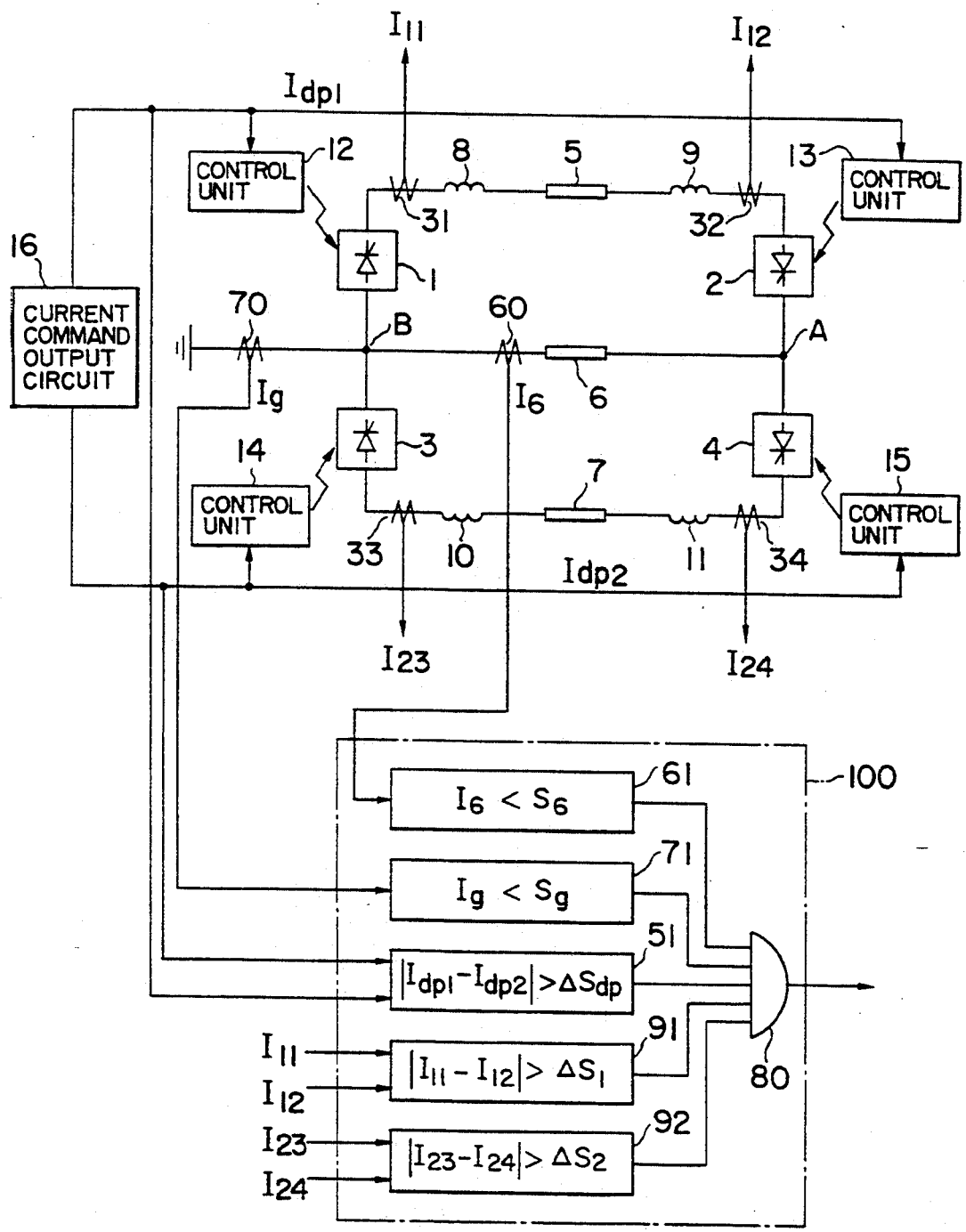
FIG. 8 is a block diagram showing a modification of an apparatus for detecting a short-circuit according to this invention.

FIG. 8 shows a modification of this invention. In this modification, currents $I_{11}$, $I_{12}$, $I_{23}$ and $I_{24}$ flowing in respective converters 1, 2, 3 and 4 are detected by current detectors 31, 32, 33 and 34, respectively. This apparatus of the modification further includes a current difference monitor circuit 91 adapted for outputting a logic signal "1" when a current difference $\Delta I_1 = |I_{11} - I_{12}|$ of the both power converters 1 and 2 of the first pole is above a fourth predetermined value $\Delta S_1$ (i.e., if there results the state where $\Delta I_1 = |I_{11} - I_{12}| > \Delta S_1$ holds); and a current difference monitor circuit 92 adapted for outputting a logic signal "1" when a current difference $\Delta I_2 = |I_{23} - I_{24}|$ of the both power converters 4 and 3 of the second pole is above a fifth predetermined value $\Delta S_2$ (i.e., if there results the state where $\Delta I_2 = |I_{23} - I_{24}| > \Delta S_2$ holds). The fourth and fifth predetermined values $\Delta S_1$ and $\Delta S_2$ are a little smaller than a current margin $\Delta I_{dp}$ in the d.c. power transmission system, respectively, for example, equal to a 70-80% of the current margin $\Delta I_{dp}$. Logical outputs from these current difference monitor circuits 91 and 92 are introduced also to the AND circuit 80. By employing such a configuration, the AND circuit 80 is caused to provide an operating output on condition that a current difference of the both ends of the d.c. power transmission line 5 of the first pole and a current difference of the both ends of the d.c. power transmission line 7 of the second pole are beyond respective predetermined values. Accordingly, a more reliable short-circuit detection can be realized.

As described above, in accordance with this invention, when a short-circuit is taking place in a d.c. transmission system in the state of the power sending back operation, a short-circuit of the d.c. transmission line can be detected before an attempt is made to alter a current command value of one pole. Accordingly, it is possible to take a procedure to allow bi-polar current command values to be in correspondence with respective original values, or an similar procedure before there results the state where the operating points of the voltage/current characteristics of the power converters cannot be ensured, thus to stop respective power converters in a stabilized manner. Thus, it is possible to prevent in advance inconveniences such that the power converter may be damaged and/or bad influence may be exerted on the a.c. system.

What is claimed is:

1. An apparatus for detecting a short-circuit of a bi-polar d.c. transmission system having first and second transmission lines and a neutral line, one end of said neutral line being grounded and another end thereof not being grounded, said short-circuit detecting apparatus comprising:
   first monitoring means for providing a detection output when a current flowing through said neutral lien of said bi-polar d.c. transmission system is below a predetermined value;
   second monitoring means for providing a detection output when a ground current flowing between a ground point of said neutral line and the ground is below a predetermined value;
   third monitoring means for monitoring bi-polar current command values to provide a detection output when a difference between said current command values is above a predetermined value; and
   a logic circuit responsive to outputs of said first, second and third monitoring means.

2. An apparatus for detecting a short-circuit of a bi-polar d.c. transmission system as set forth in claim 1, wherein said first monitoring means includes:
   a first current detector for detecting a current flowing in said neutral line; and
   a first monitor circuit for monitoring an output value of said first current detector.

3. An apparatus for detecting a short-circuit of a bi-polar d.c. transmission system as set forth in claim 1, wherein said second monitoring means includes:
   a second current detector for detecting said ground current; and
   a second monitor circuit for monitoring an output value of said second current detector.

4. An apparatus for detecting a short-circuit of a bi-polar d.c. transmission system as set forth in claim 1, wherein said logic circuit is an AND gate.

5. An apparatus for detecting a short-circuit of a bi-polar d.c. transmission system as set forth in claim 1, which further comprises:
   fourth monitoring means for providing a detection output when a difference between currents detected at ends of said first transmission line is above a predetermined value; and
   fifth monitoring means for providing a detection output when a difference between currents detected at ends of said second transmission line is above a predetermined value;
   said logic circuit additionally responding to outputs of said fourth and fifth monitoring means.

6. An apparatus for detecting a short-circuit of a bi-polar d.c. transmission system as set forth in claim 5, wherein
   said fourth monitoring means includes:
   third and fourth current detectors for detecting said currents at said ends of said first transmission line, respectively; and
   a first current difference monitor circuit for monitoring a difference between an output of said third current detector and an output from said fourth current detector to provide a detection output when said difference is above a predetermined value;
   said fifth monitoring means include:
   fifth and sixth current detectors for detecting said currents at said ends of said second transmission line, respectively; and
   a second current difference monitor circuit for monitoring a difference between an output of said fifth current detector and an output from of said sixth current detector to provide a detection output when said difference is above a predetermined value.

* * * * *